United States Patent
Conze et al.

(10) Patent No.: US 11,433,568 B2
(45) Date of Patent: Sep. 6, 2022

(54) METHOD FOR PRODUCING A DRY PREFORM PRODUCED BY KNITTING, METHOD FOR MANUFACTURING A PRODUCT MADE OF COMPOSITE MATERIALS FROM SAID PREFORM

(71) Applicant: SAINT-GOBAIN PERFORMANCE PLASTICS FRANCE, Charny Oree de Puisaye (FR)

(72) Inventors: Pierre Conze, Toulouse (FR); Jerome Bravard, Cruscades (FR)

(73) Assignee: SAINT-GOBAIN PERFORMANCE PLASTICS FRANCE, Charny Oree de Puisaye (FR)

( * ) Notice: Subject to any disclaimer, the term of this patent is extended or adjusted under 35 U.S.C. 154(b) by 239 days.

(21) Appl. No.: 16/500,600

(22) PCT Filed: Apr. 16, 2018

(86) PCT No.: PCT/FR2018/050954
§ 371 (c)(1),
(2) Date: Oct. 3, 2019

(87) PCT Pub. No.: WO2018/189497
PCT Pub. Date: Oct. 18, 2018

(65) Prior Publication Data
US 2020/0189147 A1 Jun. 18, 2020

(30) Foreign Application Priority Data

Apr. 14, 2017 (FR) ..................... 17 70381

(51) Int. Cl.
| | |
|---|---|
| B29B 11/16 | (2006.01) |
| B29C 70/24 | (2006.01) |
| B29C 70/48 | (2006.01) |
| B29K 101/12 | (2006.01) |
| B29K 105/08 | (2006.01) |
| D04B 1/16 | (2006.01) |

(52) U.S. Cl.
CPC .............. *B29B 11/16* (2013.01); *B29C 70/24* (2013.01); *B29C 70/48* (2013.01); *B29K 2101/12* (2013.01); *B29K 2105/0836* (2013.01); *D04B 1/16* (2013.01); *D10B 2403/02412* (2013.01); *D10B 2505/02* (2013.01)

(58) Field of Classification Search
CPC ............. Y10T 428/29; Y10T 428/2929; Y10T 428/2933; D04H 1/435; D04H 1/4391; D06B 1/02; D06B 3/04; D01F 8/06; D01F 8/12; D01F 8/14; D06M 11/46; D06M 23/06; D10B 2401/041; D10B 2505/02; D10B 2403/02411; D04B 1/123; D04B 1/16; B29K 2101/12; B29K 2105/0836; B29C 70/24; B29C 70/48
USPC ....... 106/691; 252/502; 423/445 R; 427/113, 427/122; 428/373, 375, 408; 442/1, 59, 442/60, 304, 310, 313, 314, 331, 332, 442/333, 353, 354, 355
See application file for complete search history.

(56) References Cited

U.S. PATENT DOCUMENTS

2016/0075061 A1    3/2016 Waas et al.

FOREIGN PATENT DOCUMENTS

| | | |
|---|---|---|
| DE | 10 2014 000 153 A1 | 7/2014 |
| JP | 4-89207 A | 3/1992 |
| JP | 2011-241505 A | 12/2011 |
| WO | WO 2014/174101 A1 | 10/2014 |
| WO | WO 2016/039242 A1 | 3/2016 |

OTHER PUBLICATIONS

International Search Report dated Jul. 20, 2018 in PCT/FR2018/050954 filed Apr. 16, 2018.
Cutolo, D., et al., "Processing of Product Forms for the Large-Scale Manufacturing of Advanced Thermoplastic Composites", Polymers for Advanced Technologies, vol. 5, No. 9, Sep. 1, 1994, XP000484303, pp. 545-553.
Chinese Office Action dated Dec. 3, 2021 in Chinese Patent Application No. 201880024633.2 filed Apr. 16, 2018, 20 pages (with English Translation).

*Primary Examiner* — Camie S Thompson
(74) *Attorney, Agent, or Firm* — Oblon, McClelland, Maier & Neustadt, L.L.P.

(57) ABSTRACT

A method for producing a transformable dry preform, in particular for the creation of a product made of composite materials, includes the sequence of the following steps: simultaneous weft/wale knitting of at least one stitch thread and at least one unidirectional reinforcement thread, at least one stitch thread including a material, the nature of which being different to that of a material comprised in at least one unidirectional reinforcement thread, at least one of the materials being thermoplastic and having a melting point lower than the melting point of at least one other material, referred to as reinforcement material; and creating of a three-dimensional knit that constitutes a dry preform in the shape of the product that is to be obtained. Additionally, a product made of composite materials can be produced using the dry preform created by the method.

16 Claims, No Drawings

METHOD FOR PRODUCING A DRY PREFORM PRODUCED BY KNITTING, METHOD FOR MANUFACTURING A PRODUCT MADE OF COMPOSITE MATERIALS FROM SAID PREFORM

The present invention relates to a method for producing a dry preform, created by knitting, in particular for the creation of a part made of composite materials.

The method also relates to the creation of a product made of composite materials using the dry preform obtained in this manner.

Composite materials are relevant to various fields of technology. Indeed, composite materials relate to materials that comprise a reinforcement and a matrix, said reinforcement being embedded in said matrix.

Thus, reinforced concrete can be considered a composite material. Indeed, the intrinsic qualities of concrete are unimpressive and reinforcements, which are made of steel or synthetic materials and are integrated into the concrete matrix, produce radically different and vastly superior performance when compared to that of the concrete matrix on its own.

Composite materials obtained from a resin matrix and a reinforcement made of synthetic materials, generally polymers but also metals, are based on the same general principle.

Although the principle is well known, the type of reinforcement, the arrangement, the geometry, the combination of materials, the positioning of the reinforcement in the end part, in particular, represent numerous parameters that can be controlled, thus leading to innumerable solutions.

It is also necessary to take into account the aspects of cost, industrial production, durability, reproducibility and quality control.

The solutions are therefore most complex.

The present invention relates to the field of composite materials, whatever the technical field of application and whatever the matrix used, the only condition being the creation of the preform by knitting.

The present invention relates to a method for creating a transformable, dry knitted preform that incorporates threads comprising a material that is intended to form all or part of the final matrix of the composite.

According to the invention, a transformable, dry knitted preform is a reinforcement of which at least part of the materials of which it is made are able to transform by change of state, by modification of the initial structure, with the consequence that it is no longer possible to identify in an isolated manner the transformed materials in the composite material product obtained in this manner.

Organic composite materials comprise mineral synthetic fibers, such as glass, or organic fibers, which form the reinforcement and are embedded in a matrix, the composition of which includes at least one organic resin.

The techniques for manufacturing the final product, shaped according to a given plan, are various.

Laying up involves arranging at least one layer of at least one mat of non-woven fibers, and/or at least one textile obtained from woven fibers, on the internal surface of a first part of a mold so as to impart the general shape to the reinforcement. Then, either a second part of the mold is closed and then the resin composition of the matrix is injected under pressure at various chosen points, or a bladder is arranged on the assembly and the resin is introduced by creating a vacuum at various chosen points of said bladder. These various injection points or vacuum drawing points serve to allow a perfect distribution of the resin, with no trapped air bubbles, and to facilitate the flow of the resin through the reinforcement.

Products made of composite materials have one important advantage, namely that of being able to take on highly varied and very complex geometric shapes.

In the case of reinforcements created using woven or non-woven fibers, once the shape is complex it is necessary to cut out various pieces and overlap them to ensure that the mechanical strength is maintained, and to add localized reinforcement pieces, which complicates implementation. Furthermore, mechanical strength is imperfect since the fibers are not continuous.

2D or 3D knitting of threads makes it possible to create a complex product that can be directly draped over a 2D or 3D form, ensuring continuity of the threads throughout the obtained knitted product.

The aim is to make it possible, directly and with a single knitted product, to create a 3D product made of composite materials.

The aim of the present invention is to propose a transformable, dry knitted preform, as defined below.

The transformable, dry knitted preform, obtained by the method according to the invention, incorporates the reinforcement and what will become, after transformation, a coating and/or impregnation resin, or even the matrix of the composite.

The method for producing a transformable dry preform, in particular for the creation of a product made of composite materials, is characterized in that it comprises the sequence of the following steps:

simultaneous weft/wale knitting of at least one stitch thread and at least one unidirectional reinforcement thread, at least one stitch thread comprising a material, the nature of which being different to that of a material comprised in at least one unidirectional reinforcement thread, at least one of said materials being thermoplastic and having a melting point lower than the melting point of at least one other material, referred to as reinforcement material, creation of a three-dimensional knit that constitutes a dry preform in the shape of the product that is to be obtained.

The invention also covers the method for producing a product made of composite materials, obtained using the dry preform according to the present invention, which comprises the sequence of the following steps:

putting said preform in place on a model having the profile of the product that is to be created, heating to at least the lowest melting point so as to impregnate and/or coat the reinforcement material with the at least one thermoplastic material transformed by melting, and cooling the product obtained in this manner.

The stitch thread is to be understood as the thread forming the stitches of the knit. In a weft/wale knit, these stitches are gathered by the stitches of the course below.

A unidirectional reinforcement thread (or UD thread) is a thread that is inserted into the stitches of the knit, being laid and held in the stitches without engaging with the stitches.

A thermoplastic material is to be understood as a polymer material that can be melted during the production of the composite, so as to form all or part of the matrix of said composite. Examples of thermoplastic materials are polypropylenes and polycarbonates.

A reinforcement material is to be understood as a material that will not melt during the production of the composite, and which is therefore intended to form the reinforcement of the composite. Reinforcement materials include glass, carbon, quartz and certain high-temperature plastics such as aramids (for example Kevlar®).

A thread, whether it is a UD thread or a stitch thread, can be made of either a thermoplastic material or a reinforcement material. In the following detailed description, the term "material" can therefore be replaced with "thread". Alternatively, a thread may comprise multiple materials, in particular a reinforcement material and a thermoplastic material.

According to one feature of the method, a single stitch thread and a single UD thread are knitted simultaneously. The stitch thread and/or the UD thread may, independently, be made of a single material, or comprise multiple materials. For example, the stitch thread is made of a reinforcement material and the UD thread comprises a thermoplastic material and a reinforcement material. According to another example, the stitch thread comprises a thermoplastic material and a reinforcement material and the UD thread is made of a reinforcement material.

According to another feature of the method, a plurality of stitch threads and/or a plurality of UD threads are knitted simultaneously. Thus, the stitches of the knit can be formed of a plurality of stitch threads. Similarly, a plurality of UD threads can be introduced into the knit. The plurality is preferably from 2 to 10, in particular 2 to 6. All combinations are possible, for example a plurality of stitch threads (for example 2 or 3) with a single UD thread, a plurality of UD threads (for example 2 to 6) with a single stitch thread, or also a plurality of stitch threads with a plurality of UD threads. The plurality of UD threads can advantageously comprise at least one thread comprising or consisting of a thermoplastic material and at least one thread comprising or consisting of a reinforcement material. The plurality of stitch threads can comprise at least one thread comprising or consisting of a thermoplastic material and at least one thread comprising or consisting of a reinforcement material. The plurality of stitch threads may alternatively consist of threads comprising or consisting of a thermoplastic material. The plurality of stitch threads may also consist of threads comprising or consisting of a reinforcement material. Here, too, all combinations are possible and one example that can be mentioned is a plurality of UD threads comprising at least one thermoplastic thread and at least one reinforcement thread with a plurality of stitch threads also comprising at least one thermoplastic thread and at least one reinforcement thread, or also a plurality of UD threads comprising at least one thermoplastic thread and at least one reinforcement thread with a single stitch thread consisting of a reinforcement material.

As indicated previously, a thread may consist of one material or may comprise multiple materials.

According to a first embodiment, the stitch thread and the or each UD thread each consist of a different material, one being a thermoplastic material and the other being a reinforcement material. Typically, the stitch thread may consist of a thermoplastic material and the UD thread may consist of a reinforcement material.

According to a second embodiment, at least one UD thread, in particular the single UD thread, comprises at least one reinforcement material and at least one thermoplastic material, and in particular consists of a reinforcement material and a thermoplastic material. In this case the (or at least one) stitch thread may either consist of a reinforcement material or may consist of a thermoplastic material, or also may comprise a reinforcement material and a thermoplastic material.

According to a first variant of this second embodiment, the UD thread comprises a thread of a reinforcement material around which is twisted a thread of a thermoplastic material. Examples that may be mentioned are a glass thread, a carbon thread or an aramid thread around which is twisted a polypropylene thread.

According to a second variant of this second embodiment, the UD thread comprises a thread of a reinforcement material surrounded by a thermoplastic sheath. The UD thread may for example be obtained by passing the thread made of a reinforcement material through a bath of melted thermoplastic material, then co-extruding the assembly. Examples that may be mentioned are a glass thread, a carbon thread or an aramid thread surrounded by a polypropylene sheath.

According to a third variant of this second embodiment, the UD thread may comprise an intimate mixture of a plurality of filaments of at least one reinforcement material and a plurality of filaments of at least one thermoplastic material. One possible example is a thread consisting of an intimate mixture of carbon or aramid filaments and polypropylene filaments.

Whatever the chosen variant, the second embodiment is preferred as the thermoplastic material can penetrate more deeply during creation of the composite, which avoids the formation of dry areas. This results in better transmission of forces to the reinforcement, and thus better mechanical strength of the final composite material. This second embodiment also makes it possible to increase the quantity of thermoplastic material in the preform.

At least one unidirectional reinforcement thread is introduced during knitting in order to improve the mechanical properties of the composite in the direction of this unidirectional thread. It is possible to introduce a single UD thread, or multiple UD threads, in particular two UD threads.

According to one feature, knitting makes it possible to introduce unidirectional reinforcement threads, referred to as UD 90° threads, that is to say in weft. These threads are laid in the direction of the courses, without engaging with the stitches, being held in said stitches.

These unidirectional reinforcement threads improve the mechanical properties in the weft direction.

According to another feature, which may be combined with the preceding feature, unidirectional reinforcement threads, referred to as UD 0° threads, that is to say in the direction of the wales, are also integrated. These threads are laid in the direction of the wales, perpendicular to the weft, without engaging with the stitches but simply held by the stitches.

According to the present invention, the preform integrates a material designed to form the reinforcement and a material designed to form all or part of the matrix so as to obtain a product made of composite materials which may even, in certain applications, make it possible to omit the steps of injection and/or infusion of resin. Indeed, if a sufficient quantity of thermoplastic material is provided by the threads (stitch threads or UD threads), the composite material may be obtained by heating the preform with no addition of resin.

The proportion of thermoplastic material in the preform is preferably between 10 and 90% by weight, in particular between 50 and 70% by weight. The second embodiment described hereinabove makes it possible to obtain large quantities of thermoplastic material.

Threads made of thermoplastic polymers are synthetic threads having mechanical properties which allow them to be knitted.

Thermoplastic threads have low shear sensitivity, and their tensile strength is adequate for use in knitting machines.

The threads are placed in the same thread guide or are knitted at least one in the weft direction and at least one other in the direction of the knit.

The threads are knitted to form a three-dimensional knit that constitutes a preform having the 3D profile of the product that is to be obtained.

For this, use can be made of straight-type weft knitting machines.

The ratios of the at least two different materials or threads are managed by the supply of said threads, in particular by the diameter of the thread or by varying the proportion of thermoplastic material in the UD thread, if the latter contains thermoplastic material.

This makes it possible to manage the matrix/reinforcement ratio (the ratio between the reinforcement material and the thermoplastic material) by the choice of threads, the supply of threads, the density of the cloth, or by varying the proportion of thermoplastic material in the UD thread, if the latter contains thermoplastic material.

The accuracy of the ratio is important and, especially, the distribution of the quantity of the at least two materials over the entire surface of the product is perfectly controlled.

The dry preform has a three-dimensional shape. Preferably, its shape is conical or cylindrical. It can in particular be a cylinder of circular or rectangular cross section.

The dry preform may comprise a plurality of regions (for example 2, 3 or more) that differ in the nature of the stitch thread and/or the UD thread. This makes it possible to adapt the properties, in particular the mechanical properties, of the preform depending on the regions and depending on the final use of the composite. For example, the preform may comprise a first region formed of a first stitch thread and a first UD thread, and a second region formed of a second stitch thread and a second UD thread, the nature of the first UD thread being different to that of the second UD thread, and/or the nature of the first stitch thread being different to that of the second stitch thread.

The method for producing a product made of composite materials using the dry preform created then involves placing said transformable dry preform on a model having the profile of the product that is to be obtained, which can be rigid or inflatable when the shape is complex, so as to allow removal therefrom.

According to the method of the present invention, the obtained knitted dry preform is heated to the melting point of at least one of the thermoplastic materials (in particular threads) used, that is to say to a temperature at which said at least one thermoplastic material is viscous or even liquid, such that it can coat or impregnate the at least one other material (in particular thread) of the preform, or even embed said materials (in particular threads) in the resulting thermoplastic matrix. In the case of multiple materials having different melting points, the temperature to be used is that at which the desired materials are viscous but below that of the materials that should remain solid.

The method provides for cooling of the preform after transformation, after exceeding the melting point of at least one of the thermoplastic materials, so as to obtain a rigid, semi-rigid or flexible product having the profile of the product that is to be obtained. The features of rigidity, semi-rigidity or flexibility depend on the ratio (or content of thermoplastic material):if the quantity of thermoplastic material is low and only impregnates the at least one other material, flexibility will be high; if the quantity of thermoplastic material is very high and results in abundant coating, rigidity will be greater.

According to one preferred embodiment of the invention, the method for producing the composite comprises no step of adding (in particular by injection and/or infusion) a resin. The preform is used directly, adapting the ratio of materials in order to obtain the desired mechanical properties, the at least one thermoplastic material or thread then forming the matrix after transformation and the at least one reinforcement material forming the reinforcement. That is possible in the case of a rigid preform, that is to say containing a sufficient proportion of thermoplastic material (typically at least 30 or 40% by weight).

The initial dry preform directly becomes the 3D product after transformation and removal of the preform from the model.

According to another, less preferred embodiment, the preform is integrated into a resin matrix. To that end, the transformed preform is integrated in a mold for injection or beneath a bladder for infusion, so as to allow said preform to be integrated into a matrix comprising at least one resin that is designed to be polymerized in turn so as to obtain a product made of composite materials having the desired profile. This can be necessary when the preform consists principally of reinforcement material, forming the reinforcement, with a very small proportion of thermoplastic material. The reinforcement is then rigid or semi-rigid, but can be flexible, and comprises only threads that are just coated or impregnated by said at least one thermoplastic polymer.

The resin in which the reinforcement may be embedded must be compatible with the thermoplastic and reinforcement materials. The resin is for example an epoxy resin.

The preform can be used for the creation of composite products in construction, in association with mineral materials with a hydraulic binder or for finishing works, but principally for the aeronautical, medical and furniture fields, this list being entirely non-restrictive and non-limiting.

The following examples provide a non-limiting illustration of the invention.

EXAMPLE 1

A three-dimensional dry preform, conical in shape, has been obtained by knitting simultaneously:
- in stitch, a glass thread (linear mass 34 tex, that is to say 34 mg/m) and a polycarbonate thread (60 tex)
- in weft, three glass UD threads (100 tex) and 3 polycarbonate UD threads (60 tex).

Thus, the knit contains a plurality of stitch threads, in this case 2, including threads made of reinforcement material and threads made of thermoplastic material and a plurality of UD threads, in this case 6, including threads made of reinforcement material and threads made of thermoplastic material.

The knit could be transformed into a composite material with no addition of resin.

EXAMPLE 2

A three-dimensional dry preform, in the form of a circular pipe, has been obtained by knitting simultaneously:
- in stitch, a Kevlar® thread (89 tex),
- in weft, a UD Kevlar® thread (158 tex) and 2 UD PEI threads (132 tex)

Thus, the knit contains a single stitch thread made of a reinforcement material and a plurality of UD threads, in this case 3, including one made of reinforcement material and two threads made of thermoplastic material.

The knit could be transformed into a composite material with no addition of resin.

The invention claimed is:

1. A method for producing a transformable dry preform, comprising a sequence of the following steps:
    simultaneous weft/wale knitting of at least one stitch thread and at least one unidirectional reinforcement thread, a material of said at least one unidirectional reinforcement thread comprising a thermoplastic material and a reinforcement material, the thermoplastic material having a melting point lower than a melting point of the reinforcement material, a material of the at least one stitch thread comprising the thermoplastic material or the reinforcement material, and
    creating a three-dimensional knit that constitutes a dry preform in a shape of a product that is to be obtained from the dry preform.

2. The method for producing a dry preform as claimed in claim 1, in which said at least one unidirectional reinforcement thread is introduced in weft, in the direction of the courses, being laid and held in the stitches without engaging with the stitches.

3. The method for producing a dry preform as claimed in claim 1, in which said at least one unidirectional reinforcement thread is introduced in the direction of the wales, being laid and held in the stitches without engaging with the stitches.

4. The production method as claimed in claim 1, in which a plurality of stitch threads and/or a plurality of unidirectional reinforcement threads are knitted simultaneously.

5. A dry preform that is obtained by the method as claimed in claim 1.

6. A method for producing a product made of composite materials, comprising:
    using the dry preform as claimed in claim 5,
        putting said preform in place on a model having the profile of the product that is to be created,
        heating to at least the lowest melting point so as to impregnate and/or coat the at least one other thread made of at least one other material with the at least one thermoplastic material transformed by melting, and
        cooling the product obtained in this manner.

7. The method for producing a product made of composite materials as claimed in claim 6, in which the preform is integrated into a resin matrix.

8. The method for producing a product made of composite materials as claimed in claim 6, which does not comprise a step of adding resin.

9. A composite material that is obtained by the method of claim 6.

10. The production method as claimed in claim 1, in which the product that is to be obtained from the dry preform is made of composite materials.

11. The method for producing a dry preform as claimed in claim 1, in which the at least one unidirectional reinforcement thread comprises a thread of the reinforcement material that is twisted around a thread of the thermoplastic material.

12. The method for producing a dry preform as claimed in claim 11, in which the reinforcement material is glass, carbon, or aramid, and the thermoplastic material is polypropylene.

13. The method for producing a dry preform as claimed in claim 1, in which the at least one unidirectional reinforcement thread comprises a thread of the reinforcement material that is surrounded by a sheath of the thermoplastic material.

14. The method for producing a dry preform as claimed in claim 13, in which the reinforcement material is glass, carbon, or aramid, and the thermoplastic material is polypropylene.

15. The method for producing a dry preform as claimed in claim 1, in which the at least one unidirectional reinforcement thread comprises a mixture of a plurality of filaments of the reinforcement material and a plurality of filaments of the thermoplastic material.

16. A method for producing a product made of composite materials, comprising:
    using a dry preform obtained by a sequence comprising the following steps:
        simultaneous weft/wale knitting of at least one stitch thread and at least one unidirectional reinforcement thread, at least one of said materials being thermoplastic and having a melting point lower than the melting point of at least one other material, referred to as reinforcement material, and
        creating a three-dimensional knit that constitutes a dry preform in a shape of a product that is to be obtained from the dry preform
    putting said preform in place on a model having the profile of the product that is to be created;
    heating to at least the lowest melting point so as to impregnate and/or coat the at least one other thread made of at least one other material with the at least one thermoplastic material transformed by melting; and
    cooling the product obtained in this manner,
    wherein the method for producing a product made of composite materials does not include a step of adding resin.

* * * * *